(12) United States Patent
Kawasaki et al.

(10) Patent No.: US 12,744,157 B2
(45) Date of Patent: Sep. 22, 2026

(54) MULTILAYER CERAMIC CAPACITOR

(71) Applicant: Murata Manufacturing Co., Ltd., Nagaokakyo (JP)

(72) Inventors: Junichi Kawasaki, Nagaokakyo (JP); Shoji Fukui, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 170 days.

(21) Appl. No.: 18/411,092

(22) Filed: Jan. 12, 2024

(65) Prior Publication Data

US 2024/0249881 A1 Jul. 25, 2024

(30) Foreign Application Priority Data

Jan. 24, 2023 (JP) ................................ 2023-008474

(51) Int. Cl.
*H01G 4/30* (2006.01)
*H01G 4/012* (2006.01)

(52) U.S. Cl.
CPC ............... *H01G 4/012* (2013.01); *H01G 4/30* (2013.01)

(58) Field of Classification Search
CPC ............ H01G 4/012; H01G 4/30; H01G 4/12; H01G 4/1209; H01G 4/1227; H01G 4/224; H01G 4/232
See application file for complete search history.

(56) References Cited

U.S. PATENT DOCUMENTS

2006/0245141 A1* 11/2006 Shirasu .................. H01G 4/012 361/303
2008/0304204 A1* 12/2008 Suzuki ..................... H01G 4/30 361/321.3
2015/0340155 A1* 11/2015 Fukunaga ............... H01G 4/30 361/301.4
2018/0166217 A1 6/2018 Kato
2019/0221368 A1* 7/2019 Ono ......................... H01G 4/30
2021/0005382 A1* 1/2021 Park ....................... H01G 4/012
2021/0166881 A1* 6/2021 Kim ........................ H01G 4/012
2021/0335548 A1* 10/2021 Ikeda ...................... H01G 4/30

FOREIGN PATENT DOCUMENTS

CN 116705509 A * 9/2023 ............. H01G 2/065
JP 2018-098346 A 6/2018
JP 2018174336 A * 11/2018
JP 7150437 B2 * 10/2022 ............. H01G 4/224
KR 20190035178 A * 4/2019 ............. H01G 13/00
KR 102437801 B1 * 8/2022 ........... H01G 4/1209

OTHER PUBLICATIONS

English Machine Translation of JP2018174336 (Year: 2018).*

* cited by examiner

*Primary Examiner* — Timothy J. Dole
*Assistant Examiner* — Esther N Lian
(74) *Attorney, Agent, or Firm* — Keating & Bennett, LLP

(57) ABSTRACT

A multilayer ceramic capacitor includes a multilayer body including dielectric layers and electrode layers laminated therein, and two external electrodes respectively provided on two end surfaces of the multilayer body. As seen in a plane including a width and a lamination direction in a middle portion in a length direction, among the internal electrode layers, end portions in the width direction of about 90% or more of internal electrode layers in a middle in the lamination direction are curved toward a second main surface.

19 Claims, 5 Drawing Sheets

1
10
20
20
20
30
31
311
312
32
321
322
TS1
TS2
LS1
LS2
415
416
41
(40)
425
426
42
(40)
L10
L11
L12
100
101
102
Z(T)
Y(W)
X(L)

MULTILAYER CERAMIC CAPACITOR

CROSS REFERENCE TO RELATED APPLICATIONS

This application claims the benefit of priority to Japanese Patent Application No. 2023-008474, filed on Jan. 24, 2023. The entire contents of this application are hereby incorporated herein by reference.

BACKGROUND OF THE INVENTION

1. Field of the Invention

The present invention relates to a multilayer ceramic capacitor.

2. Description of the Related Art

Multilayer ceramic capacitors have been known, each of which include a multilayer body in which a plurality of dielectric layers made of a ceramic material and a plurality of internal electrode layers are laminated, and external electrodes provided at end surfaces of the multilayer body. (e.g., see Japanese Unexamined Patent Application Publication No. 2018-98346). The multilayer ceramic capacitor disclosed in Japanese Unexamined Patent Application Publication No. 2018-98346 includes side margin portions provided on the lateral surfaces of the multilayer body to sandwich the plurality of dielectric layers and the plurality of internal electrode layers, and each including a dielectric made of a ceramic material.

In the multilayer ceramic capacitor disclosed in Japanese Unexamined Patent Application Publication No. 2018-98346, when each of the side margin portions is formed, the end portion in the width direction of each of the internal electrode layers adjacent to the main surface of the multilayer body is curved toward the main surface. Such a configuration can reduce or prevent short circuit failure of the internal electrode layer in the vicinity of the corner portion.

However, the phenomenon in which the end portion in the width direction is curved is not necessarily occurring only for the internal electrode layers adjacent to the main surface of the multilayer body, but may occur for all of the internal electrode layers. Further, the curved directions are not necessarily toward the main surface of the multilayer body, and may vary in various directions. If the curved directions of the end portions in the width direction of the internal electrode layers vary, a short circuit may occur in the internal electrode layer.

SUMMARY OF THE INVENTION

Example embodiments of the present invention provide multilayer ceramic capacitors that each are able to reduce or prevent short circuiting of an internal electrode layer.

An example embodiment of the present invention provides a multilayer ceramic capacitor including a multilayer body including a plurality of dielectric layers and a plurality of internal electrode layers laminated therein, a first main surface and a second main surface opposed to each other in a lamination direction, a first lateral surface and a second lateral surface opposed to each other in a width direction intersecting the lamination direction, and two end surfaces opposed to each other in a length direction intersecting the lamination direction and the width direction, and two external electrodes respectively provided on the two end surfaces of the multilayer body. As seen in a plane including the width direction and the lamination direction in a middle portion in the length direction, among the plurality of internal electrode layers, end portions in the width direction of about 90% or more of internal electrode layers in a middle in the lamination direction are curved toward the second main surface.

According to example embodiments of the present invention, it is possible to reduce or prevent short circuiting of an internal electrode layer in multilayer ceramic capacitors.

The above and other elements, features, steps, characteristics and advantages of the present invention will become more apparent from the following detailed description of the example embodiments with reference to the attached drawings.

DETAILED DESCRIPTION OF THE EXAMPLE EMBODIMENTS

Figure 1:
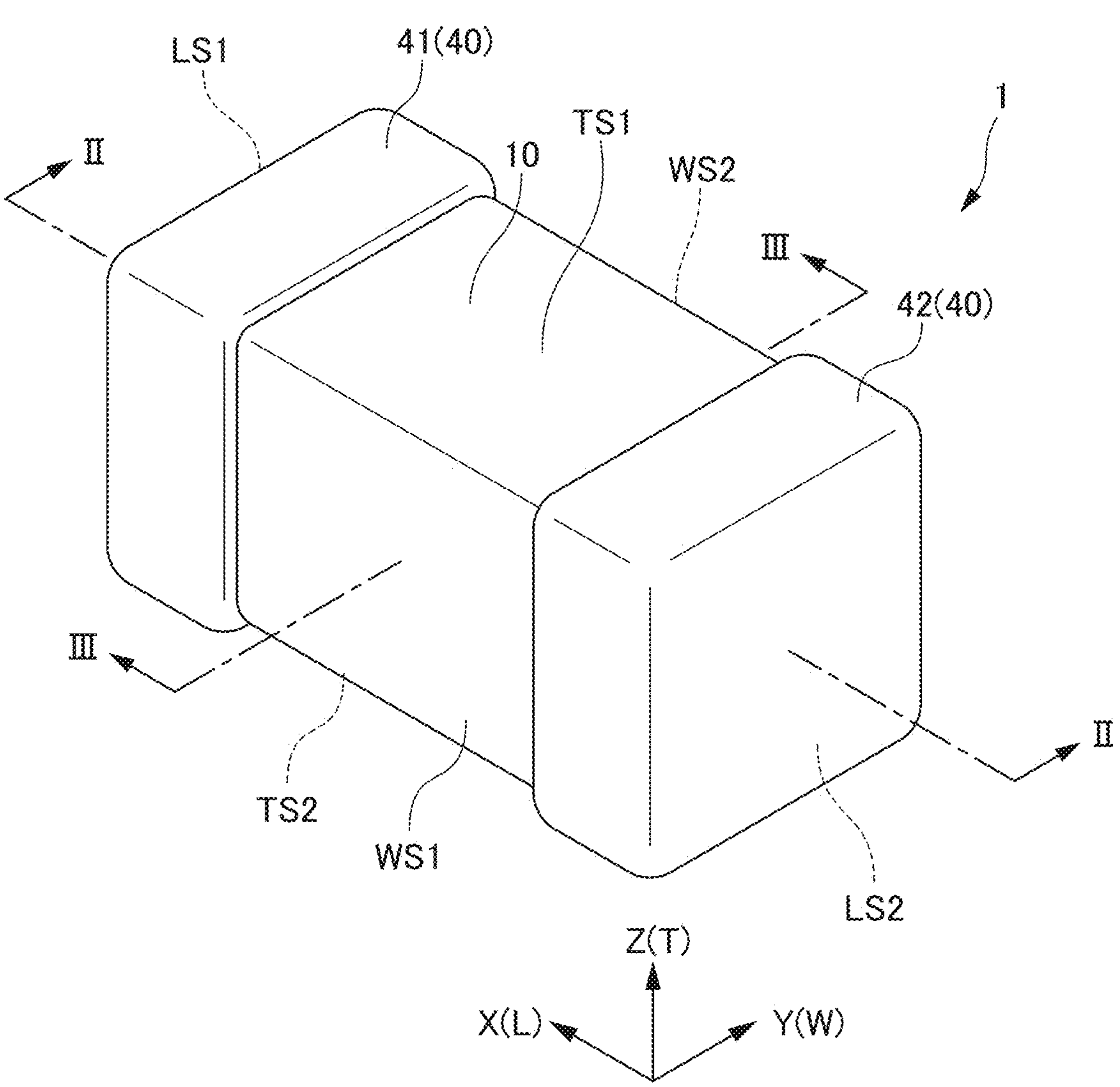
FIG. 1 is a perspective view showing a multilayer ceramic capacitor according to an example embodiment of the present invention.

Example embodiments of the present invention will now be described with reference to the accompanying drawings. In the drawings, the same or corresponding portions are denoted by the same reference numerals.

Multilayer Ceramic Capacitor

Figure 2:
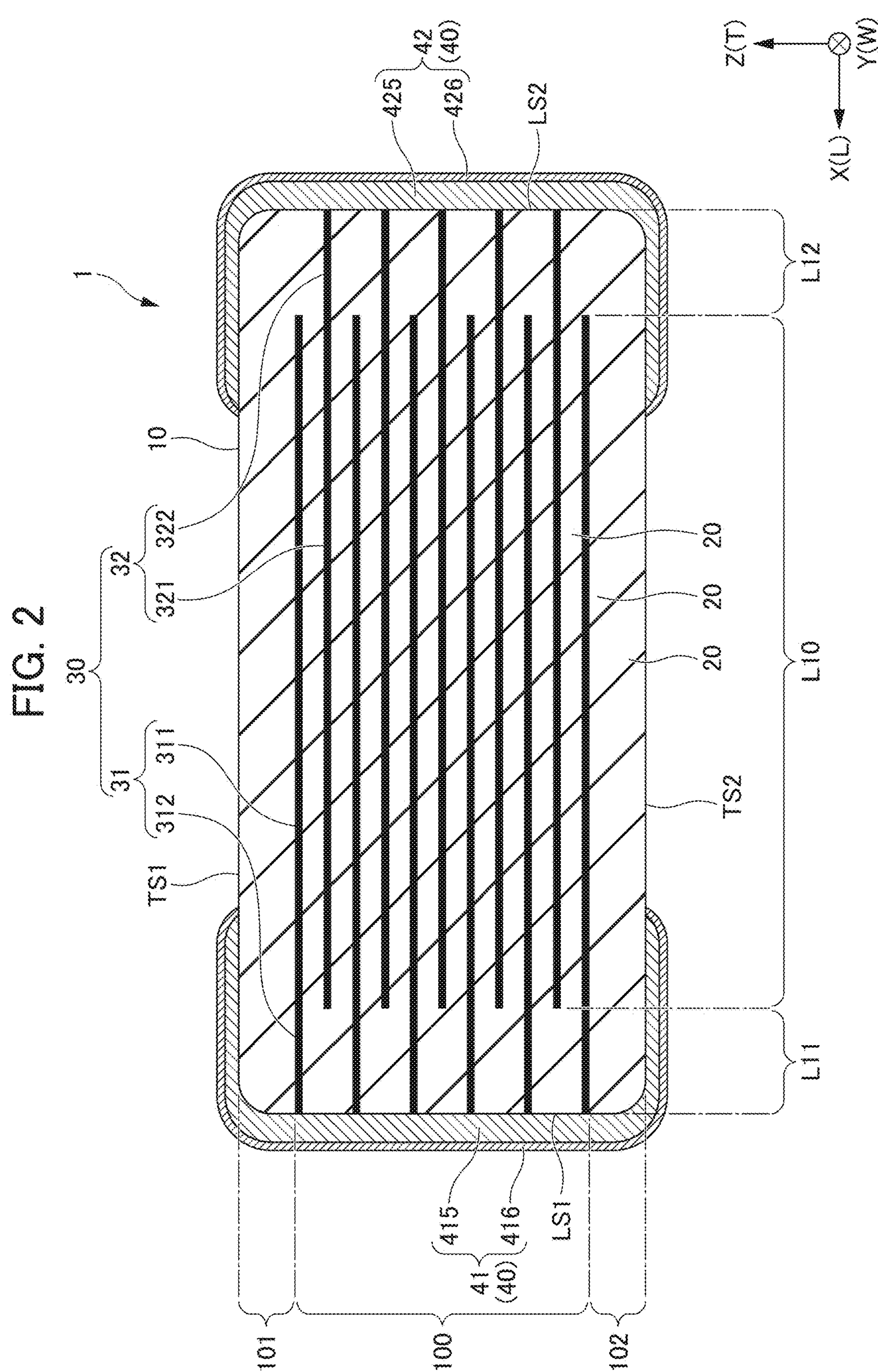
FIG. 2 is a cross-sectional view (LT cross-section) taken along the line II-II of the multilayer ceramic capacitor shown in FIG. 1.
Figure 3:
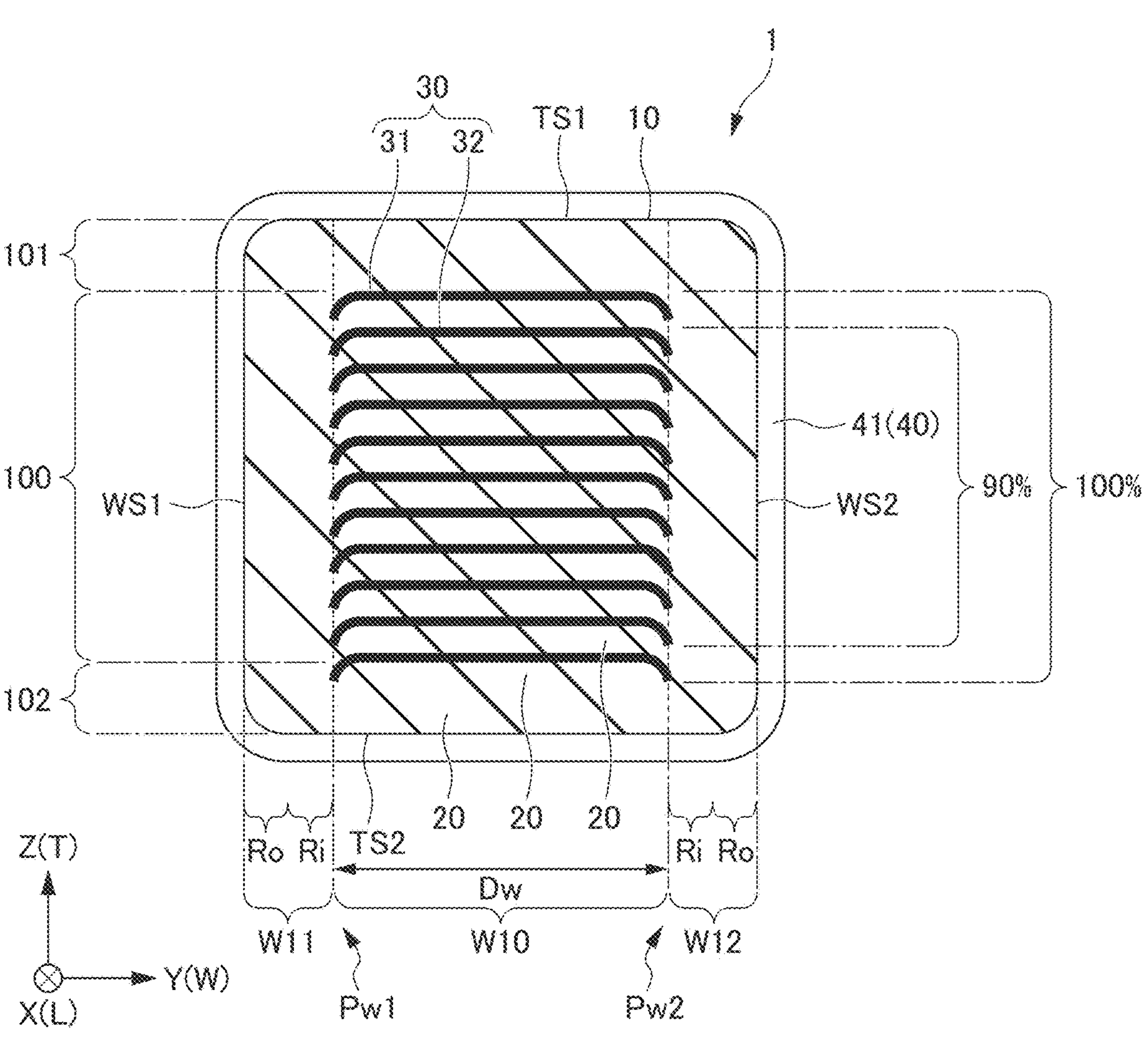
FIG. 3 is a cross-sectional view (WT cross-section) taken along the line III-III of the multilayer ceramic capacitor shown in FIG. 1.

FIG. 1 is a perspective view showing a multilayer ceramic capacitor according to an example embodiment of the present invention. FIG. 2 is a cross-sectional view taken along a line II-II of the multilayer ceramic capacitor shown in FIG. 1. FIG. 3 is a cross-sectional view taken along a line III-III of the multilayer ceramic capacitor shown in FIG. 1. The multilayer ceramic capacitor 1 shown in FIGS. 1 to 3 includes a multilayer body 10 and external electrodes 40. The external electrodes 40 preferably include at least a first external electrode 41 and a second external electrode 42.

FIGS. 1 to 3 each show an XYZ orthogonal coordinate system. The X direction refers to the length direction L of the multilayer ceramic capacitor 1 and the multilayer body 10. The Y direction refers to the width direction W of the multilayer ceramic capacitor 1 and the multilayer body 10. The Z direction refers to the lamination (stacking) direction T of the multilayer ceramic capacitor 1 and the multilayer body 10. Thus, the cross section shown in FIG. 2 is also referred to as an LT cross section, and the cross section shown in FIG. 3 is also referred to as a WT cross section.

The length direction L, the width direction W, and the lamination direction T are not necessarily orthogonal to each other, and may intersect each other.

The multilayer body 10 preferably has a rectangular or substantially rectangular parallelepiped shape, and includes a first main surface TS1 and a second main surface TS2 which are opposed to each other in the lamination direction T, a first lateral surface WS1 and a second lateral surface WS2 which are opposed to each other in the width direction W, and a first end surface LS1 and a second end surface LS2 which are opposed to each other in the length direction L.

Corner portions and ridge portions of the multilayer body 10 are preferably rounded. The corner portions are each provided a portion where the three surfaces of the multilayer body 10 intersect, and the ridge portions are each provided at a portion where the two surfaces of the multilayer body 10 intersect.

As shown in FIGS. 2 and 3, the multilayer body 10 preferably includes a plurality of dielectric layers 20 and a plurality of internal electrode layers 30 laminated in the lamination direction T. The multilayer body 10 includes an inner layer portion 100, and a first outer layer portion 101 and a second outer layer portion 102 which sandwich the inner layer portion 100 in the lamination direction T.

The inner layer portion 100 includes a portion of the plurality of dielectric layers 20 and a plurality of internal electrode layers 30. In the inner layer portion 100, a plurality of internal electrode layers 30 are opposed to each other with the dielectric layer 20 interposed therebetween. The inner layer portion 100 is a portion that generates capacitance and substantially defines and functions as a capacitor.

The first outer layer portion 101 is provided adjacent to the first main surface TS1 of the multilayer body 10, and the second outer layer portion 102 is provided adjacent to the second main surface TS2 of the multilayer body 10. More specifically, the first outer layer portion 101 is provided between the internal electrode layer 30 closest to the first main surface TS1 among the plurality of internal electrode layers 30 and the first main surface TS1, and the second outer layer portion 102 is provided between the internal electrode layer 30 closest to the second main surface TS2 among the plurality of internal electrode layers 30 and the second main surface TS2. The first outer layer portion 101 and the second outer layer portion 102 do not include the internal electrode layer 30, but do include portions of the plurality of dielectric layers 20 other than the portion for the inner layer portion 100. The first outer layer portion 101 and the second outer layer portion 102 are portions, each functioning as a protective layer of the inner layer portion 100.

Furthermore, as shown in FIG. 3, the multilayer body 10 includes a first side margin portion W11 and a second side margin portion W12 provided to sandwich the inner layer portion 100, the first outer layer portion 101, and the second outer layer portion 102, that is, the plurality of dielectric layers 20 and the plurality of internal electrode layers 30, in the width direction W. A portion sandwiched between the first side margin portion W11 and the second side margin portion W12 and including the plurality of dielectric layers 20 and the plurality of internal electrode layers 30 is also referred to as an electrode counter portion W10.

The first side margin portion W11 is provided adjacent to the first lateral surface WS1 of the multilayer body 10, and the second side margin portion W12 is provided adjacent to the second lateral surface WS2 of the multilayer body 10. More specifically, the first side margin portion W11 is positioned between the end of the internal electrode layer 30 adjacent to the first lateral surface WS1 and the first lateral surface WS1, and the second side margin portion W12 is positioned between the end of the internal electrode layer 30 adjacent to the second lateral surface WS2 and the second lateral surface WS2. The first side margin portion W11 and the second side margin portion W12 are each preferably made of a dielectric material. The first side margin portion W11 and the second side margin portion W12 are portions each defining and functioning as a protective layer of the internal electrode layer 30. The first side margin portion W11 and the second side margin portion W12 are each referred to as a side gap or a W gap.

As a material of the dielectric layer 20, for example, a dielectric ceramic including $BaTiO_3$, $CaTio_3$, $SrTiO_3$, $CaZrO_3$, or the like as a main component can be used. Further, as a material of the dielectric layer 20, for example, a Mn compound, an Fe compound, a Cr compound, a Co compound, a Ni compound, or the like may be added as a subcomponent. More specifically, the dielectric layer 20 preferably includes a plurality of dielectric grains. The dielectric grains are barium titanate ceramics such as, for example, perovskite compounds including Ba and Ti. The dielectric grain may include, for example, at least one of La, Ce, Pr, Nd, Sm, Eu, Gd, Tb, Dy, Ho, Er, Im, Yb, Lu, and Y as a subcomponent.

The thickness of the dielectric layer 20 is not particularly limited, but is preferably, for example, about 0.3 μm or more and about 0.5 μm or less, and more preferably about 0.35 μm or more and about 0.45 μm or less. The number of dielectric layers 20 is not particularly limited, but is preferably, for example, 100 or more and 1000 or less. The number of the dielectric layers 20 is a total number of the number of the dielectric layers of the inner layer portion and the number of the dielectric layers of the outer layer portion. Further, the thickness in the width direction W of each of the first outer layer portion 101 and the second outer layer portion 102 is not particularly limited, but is preferably, for example, about 5 μm or more and about 30 μm or less.

Similarly, a dielectric ceramic including, for example, $BaTiO_3$, $CaTiO_3$, $SrTiO_3$, $CaZrO_3$, or the like as a main component can be used as a material of the dielectric of the first side margin portion W11 and the second side margin portion W12. Further, for example, as a material of the dielectric of the first side margin portion W11 and the second side margin portion W12, a Mn compound, an Fe compound, a Cr compound, a Co compound, a Ni compound, or the like may be added as a subcomponent. More specifically, the dielectric of the first side margin portion W11 and the second side margin portion W12 include a plurality of dielectric grains. The dielectric grains are barium titanate ceramics such as, for example, perovskite compounds including Ba and Ti. The dielectric grain may include, for example, at least one of La, Ce, Pr, Nd, Sm, Eu, Gd, Tb, Dy, Ho, Er, Tm, Yb, Lu, and Y as a subcomponent.

The thickness of each of the first side margin portion W11 and the second side margin portion W12 is not particularly limited, but is preferably, for example, about 3 μm or more and about 30 μm or less. The dielectric in each of the first side margin portion W11 and the second side margin portion W12 is not particularly limited, but may include a single-layer configuration or a multi-layer configuration including two or more layers. In addition, there are cases where the particle sizes of the dielectric grains extremely differ within the side margin portion. In such a case, a multi-layer configuration may substantially appear to include a single layer using the optical microscope due to the boundary between the dielectric grains being ambiguous. However, such a case is still treated as including a multi-layer configuration.

As shown in FIGS. 2 and 3, the plurality of internal electrode layers 30 include a plurality of first internal electrode layers 31 and a plurality of second internal electrode layers 32. The plurality of first internal electrode layers 31 and the plurality of second internal electrode layers 32 are alternately provided in the lamination direction T of the multilayer body 10.

The first internal electrode layers 31 each include a counter electrode portion 311 and an extension electrode portion 312, and the second internal electrode layers 32 each include a counter electrode portion 321 and an extension electrode portion 322.

The counter electrode portion 311 and the counter electrode portion 321 are opposed to each other with the dielectric layer 20 interposed therebetween in the lamination direction T of the multilayer body 10. The shapes of the counter electrode portion 311 and the counter electrode portion 321 are not particularly limited, and may be rectangular or substantially rectangular, for example. The variation in the dimensions Dw of the counter electrode portion 311 and the counter electrode portion 321 in the width direction W is preferably, for example within about ±5% in standard deviation. End portions Pw1 and Pw2 of the counter electrode portion 311 and the counter electrode portion 321 in the width direction W are each aligned so as to be positioned in a range of about 3 μm in the width direction, for example. The counter electrode portion 311 and the counter electrode portion 321 are portions which substantially define and function as capacitors to generate capacitances.

The extension electrode portion 312 extends from the counter electrode portion 311 toward the first end surface LS1 of the multilayer body 10, and is exposed at the first end surface LS1. The extension electrode portion 322 extends from the counter electrode portion 321 toward the second end surface LS2 of the multilayer body 10, and is exposed at the second end surface LS2. The shapes of the extension electrode portion 312 and the extension electrode portion 322 are not particularly limited, and each may be a rectangular or substantially rectangular shape, for example.

Thus, the first internal electrode layer 31 is connected to the first external electrode 41, and a gap exists between the first internal electrode layer 31 and the second end surface LS2 of the multilayer body 10, i.e., the second external electrode 42. Furthermore, the second internal electrode layer 32 is connected to the second external electrode 42, and a gap exists between the second internal electrode layer 32 and the first end surface LS1 of the multilayer body 10, i.e., the first external electrode 41.

The first internal electrode layer 31 and the second internal electrode layer 32 preferably include, for example, metal Ni as a main component. Furthermore, the first internal electrode layer 31 and the second internal electrode layer 32 may include, for example, at least one of Cu, Ag, Pd, and Au or alloys including at least one of these metals such as, for example, Ag—Pd alloy as a main component, or may include a component other than the main component. Furthermore, the first internal electrode layer 31 and the second internal electrode layer 32 may include dielectric particles having the same composition as the ceramic included in the dielectric layer 20 as components other than the main component. In this disclosure, the metal of the main component is defined as a metal component most extensively detected in the EDX analysis.

The thicknesses of the first internal electrode layer 31 and the second internal electrode layer 32 are not particularly limited, but are preferably, for example, about 0.35 μm or more and about 0.42 μm or less. The numbers of the first internal electrode layer 31 and the second internal electrode layer 32 are not particularly limited, but are preferably, for example, 100 or more and 1000 or less.

As shown in FIG. 2, the multilayer body 10 includes an electrode counter portion L10 in which the first internal electrode layer 31 and the second internal electrode layer 32 of the internal electrode layer 30 are opposed to each other in the length direction L, a first end margin portion L11, and a second end margin portion L12. The first end margin portion L11 is positioned between the electrode counter portion L10 and the first end surface LS1, and the second end margin portion L12 is positioned between the electrode counter portion L10 and the second end surface LS2. More specifically, the first end margin portion L11 is positioned between the end of the second internal electrode layer 32 adjacent to the first end surface LS1 and the first end surface LS1, and the second end margin portion L12 is positioned between the end of the first internal electrode layer 31 adjacent to the second end surface LS2 and the second end surface LS2. The first end margin portion L11 does not include the second internal electrode layer 32, and includes the first internal electrode layer 31 and the dielectric layer 20; and the second end margin portion L12 does not include the first internal electrode layer 31, and includes the second internal electrode layer 32 and the dielectric layer 20. The first end margin portion L11 defines and functions as an extension electrode portion to the first end surface LS1 of the first internal electrode layer 31, and the second end margin portion L12 defines and functions as an extension electrode portion to the second end surface LS2 of the second internal electrode layer 32. The first end margin portion L11 and the second end margin portion L12 are each also referred to as an end gap or an L gap.

The counter electrode portion 311 of the first internal electrode layer 31 and the counter electrode portion 321 of the second internal electrode layer 32 described above are positioned in the electrode counter portion L10. Furthermore, the extension electrode portion 312 of the first internal electrode layer 31 described above is positioned in the first end margin portion L11, and the extension electrode portion 322 of the second internal electrode layer 32 described above is positioned in the second end margin portion L12. The dimension in the length direction L of each of the first end margin portion L11 and the second end margin portion L12 is not particularly limited, but is preferably, for example, about 10 μm or more and about 60 μm or less.

The dimensions of the multilayer body 10 described above are not particularly limited but, for example, the length in the length direction L is preferably about 0.1 mm or more and about 0.6 mm or less, the width in the width direction W is preferably about 0.05 mm or more and about 0.3 mm or less, and the thickness in the lamination direction T is preferably about 0.05 mm or more and about 0.3 mm or less. Furthermore, the dimensions of the multilayer ceramic capacitor 1 including the external electrodes 40, which will be described later, are not particularly limited but, for example, the length in the length direction L is preferably about 0.1 mm or more and about 0.6 mm or less, the width in the width direction W is preferably about 0.05 mm or more and about 0.3 mm or less, and the thickness in the lamination direction T is preferably about 0.05 mm or more and about 0.3 mm or less (corresponding to sizes 0201, 0402, 0603, and 1005 according to EIA standards, including tolerances).

The average thicknesses of the dielectric layers 20 and the internal electrode layers 30 are measured as follows. First, a cross section orthogonal or substantially orthogonal to the length direction of the multilayer body exposed by polishing is observed with a scanning electron microscope. Next, the thicknesses of the dielectric layers 20 and the internal electrode layers 30 are measured on a total of five lines including a center line along the lamination direction passing through the center of the cross section of the multilayer body and two lines drawn at equal intervals from the center line on both sides. The average values of the five measurement values are defined as the average thicknesses thereof. In order to obtain more accurate average thicknesses, the above five measurement values are obtained for each of the upper portion, the center portion, and the lower portion in the lamination direction, and the average values of these measurement values are used as the average thicknesses.

The average thickness of the multilayer body 10 or the multilayer ceramic capacitor 1 is measured as follows. First, a cross section orthogonal or substantially orthogonal to the length direction of the multilayer body or the multilayer ceramic capacitor exposed by polishing is observed by a scanning electron microscope. Next, the thicknesses of the multilayer body or the multilayer ceramic capacitor are measured on a total of five lines including a center line passing through the center of the cross section of the multilayer body or the multilayer ceramic capacitor in the lamination direction and two lines drawn at equal intervals from the center line on both sides. The average value of the five measurement values is defined as the average thickness thereof. The average length of the multilayer body 10 or the multilayer ceramic capacitor 1 is measured as follows. First, a cross section orthogonal or substantially orthogonal to the length direction of the multilayer body or the multilayer ceramic capacitor exposed by polishing is observed by a scanning electron microscope. Next, the lengths of the multilayer body or the multilayer ceramic capacitor are measured on a total of five lines, including a center line passing through the center of the cross section of the multilayer body or the multilayer ceramic capacitor in the length direction and two lines drawn at equal intervals from the center line on both sides. The average value of the five measurement values is defined as the average length thereof. The average width of the multilayer body 10 or the multilayer ceramic capacitor 1 is measured as follows. First, a cross section orthogonal or substantially orthogonal to the width direction of the multilayer body or the multilayer ceramic capacitor exposed by polishing is observed with a scanning electron microscope. Next, the widths of the multilayer body or the multilayer ceramic capacitor are measured on a total of five lines, including a center line passing through the center of the cross section of the multilayer body or the multilayer ceramic capacitor in the width direction and two lines drawn at equal intervals from the center line on both sides. The average value of the five measurement values is defined as the average width thereof.

The external electrodes 40 include a first external electrode 41 and a second external electrode 42.

The first external electrode 41 is provided on the first end surface LS1 of the multilayer body 10 and is connected to the first internal electrode layers 31. The first external electrode 41 may extend from the first end surface LS1 to a portion of the first main surface TS1 and a portion of the second main surface TS2. Furthermore, the first external electrode 41 may extend from the first end surface LS1 to a portion of the first lateral surface WS1 and a portion of the second lateral surface WS2.

The second external electrode 42 is provided on the second end surface LS2 of the multilayer body 10 and is connected to the second internal electrode layers 32. The second external electrode 42 may extend from the second end surface LS2 to a portion of the first main surface TS1 and a portion of the second main surface TS2. The second external electrode 42 may extend from the second end surface LS2 to a portion of the first lateral surface WS1 and a portion of the second lateral surface WS2.

The first external electrode 41 includes a first base electrode layer 415 and a first plated layer 416, and the second external electrode 42 includes a second base electrode layer 425 and a second plated layer 426. The first external electrode 41 may include only the first plated layer 416, and the second external electrode 42 may include only the second plated layer 426.

The first base electrode layer 415 and the second base electrode layer 425 may be fired layers including metal and glass. Examples of the glass include glass components including at least one of, for example, B, Si, Ba, Mg, Al, Li, and the like. As a specific example, borosilicate glass can be used. The metal preferably includes, for example, Cu as a main component. The metal may include at least one of, for example, Ni, Ag, Pd, or Au or an alloy such as, for example, Ag—Pd alloy as a main component, or may include a component other than the main component.

The fired layer is a layer preferably obtained by applying an electrically conductive paste including a metal and glass to a multilayer body by a dipping method and firing the multilayer body. The fired layer may be fired after firing the dielectric layers and the internal electrode layer, or may be fired simultaneously with the dielectric layers the internal electrode layer. The fired layer may include a plurality of layers.

Alternatively, the first base electrode layer 415 and the second base electrode layer 425 may be, for example, resin layers, each including electrically conductive particles and a thermosetting resin. The resin layer may be provided on the fired layer described above, or may be provided directly on the multilayer body without providing the fired layer.

The resin layer is preferably a layer obtained by applying an electrically conductive paste including electrically conductive particles and a thermosetting resin to a multilayer body by a coating method and heat-curing the multilayer body. The resin layer may be heat-cured after firing the dielectric layer and the internal electrode layer, or may be heat-cured simultaneously with the dielectric layer and the internal electrode layer. The resin layer may include a plurality of layers.

The thickness per layer of each of the first base electrode layer 415 and the second base electrode layer 425 defining and functioning as a fired layer or a resin layer is not particularly limited, and may be, for example, about 1 μm or more and about 10 μm or less. The total thickness, for example, the thickest portion of each of the first base electrode layer 415 and the second base electrode layer 425 defining and functioning as a fired layer is preferably about 10 μm or more and about 30 μm or less. Further, the total thickness for example, the thickest portion of each of the first base electrode layer 415 and the second base electrode layer 425 defining and functioning as a resin layer, is preferably, for example, about 20 μm or more and about 40 μm or less.

Alternatively, the first base electrode layer 415 and the second base electrode layer 425 each may preferably be formed by a thin film formation method such as a sputtering method or a vapor deposition method, and each may be a thin film layer having a thickness of, for example, about 1 μm or less in which metal particles are deposited.

The first plated layer 416 covers at least a portion of the first base electrode layer 415, and the second plated layer 426 covers at least a portion of the second base electrode layer 425. Examples of the first plated layer 416 and the second plated layer 426 include at least one of Cu, Ni, Ag, Pd, or Au, or an alloy such as an Ag—Pd alloy.

The first plated layer 416 and the second plated layer 426 each may include a plurality of layers. They preferably include, for example, a two-layer configuration including Ni plating and Sn plating. The Ni plated layer can prevent the base electrode layer from being eroded by the solder when the ceramic electronic component is mounted, and the Sn plated layer can improve the wettability of solder when the ceramic electronic component is mounted, allowing for easy mounting.

The thickness per layer of each of the first plated layer 416 and the second plated layer 426 is not particularly limited, and may be, for example, about 5 μm or more and about 10 μm or less.

Internal Electrode Layer

Next, the internal electrode layers 30, that is, the first internal electrode layers 31 and the second internal electrode layers 32, will be further described. Among the first internal electrode layers 31 and the second internal electrode layers 32, the end portions in the width direction W of about 90% or more of the first internal electrode layers 31 and the second internal electrode layers 32 in the middle in the lamination direction T are curved toward the second main surface TS2. More specifically, in the WT cross section in the middle portion in the length direction L, the end portions in the width direction W of about 90% or more of the first internal electrode layers 31 and the second internal electrode layers 32 including the middle portion in the lamination direction T among the first internal electrode layers 31 and the second internal electrode layers 32 are curved toward the second main surface TS2.

Figure 4:
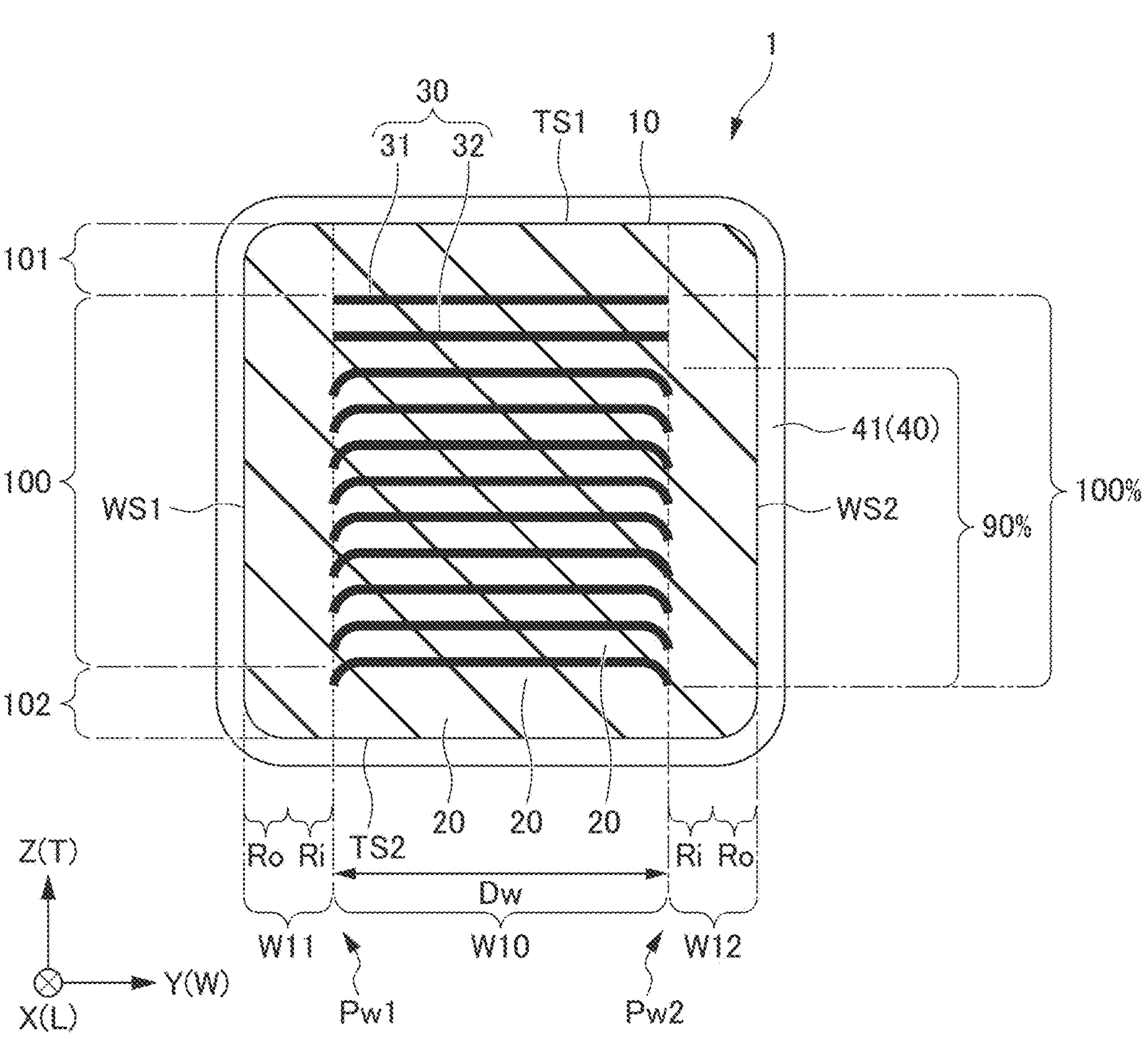
FIG. 4 is a cross-sectional view of a multilayer ceramic capacitor according to a modified example of the example embodiment of the present invention, and is a cross-sectional view (WT cross-section) corresponding to the cross section taken along the line III-III of the multilayer ceramic capacitor shown in FIG. 1.
Figure 5:
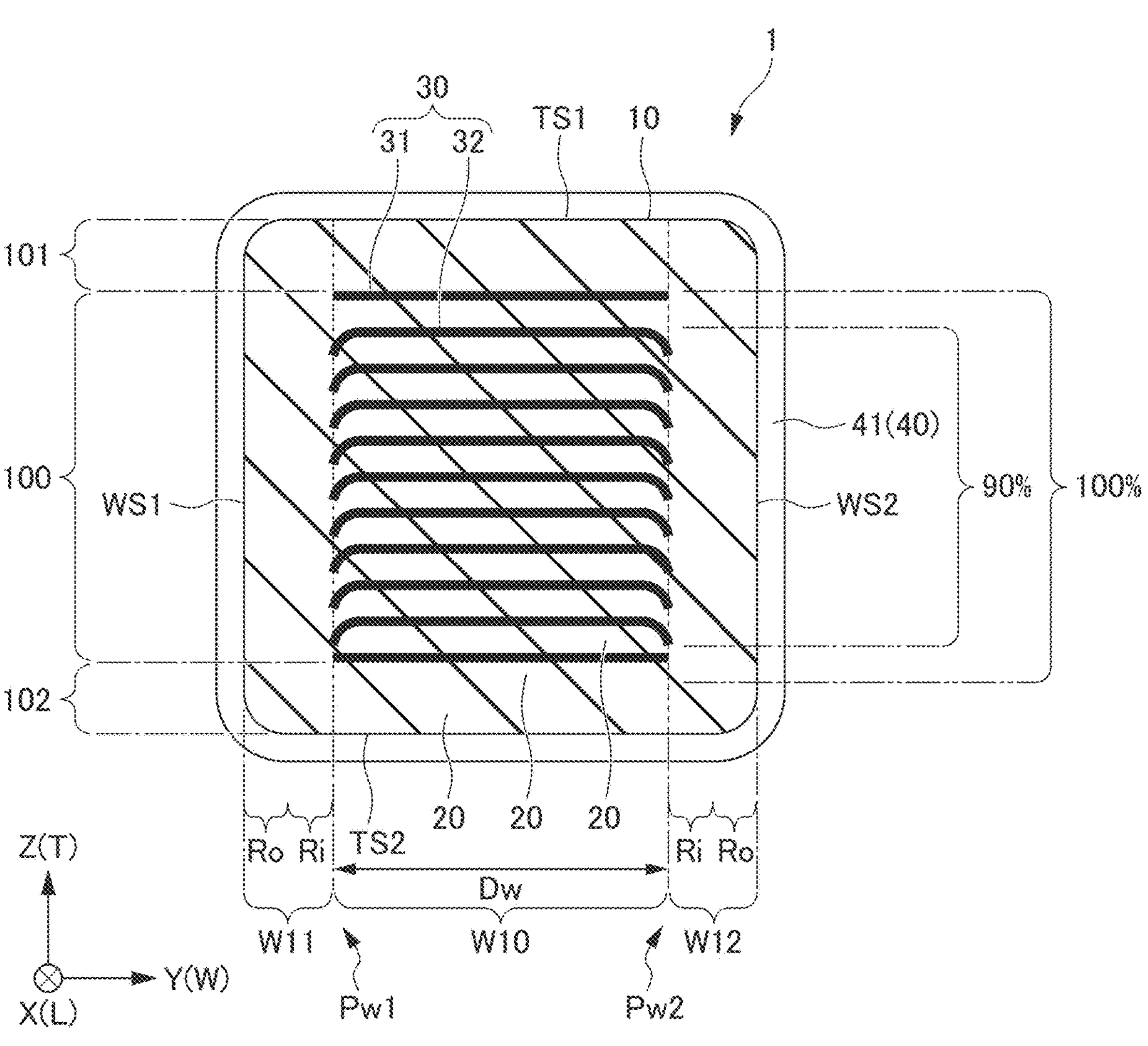
FIG. 5 is a cross-sectional view of a multilayer ceramic capacitor according to another modified example of the example embodiment of the present invention, and is a cross-sectional view (WT cross-section) corresponding to the cross section taken along the line III-III of the multilayer ceramic capacitor shown in FIG. 1.

Among the first internal electrode layers 31 and the second internal electrode layers 32, about 90% or more of the first internal electrode layers 31 and the second internal electrode layers 32 in the middle in the lamination direction T each including the end portions in the width direction W curved toward the second main surface TS2 may not include the first internal electrode layer 31 or the second internal electrode layer 32 serving as the outermost layer adjacent to the first main surface TS1 and the first internal electrode layer 31 or the second internal electrode layer 32 serving as the outermost layer adjacent to the second main surface TS2, as shown in FIG. 5, or may include the first internal electrode layer 31 or the second internal electrode layer 32 serving as the outermost layer adjacent to the second main surface TS2, as shown in FIG. 4.

When the multilayer body block is cut into multilayer chips of a predetermined size, for example, when the multilayer body block is pressed and cut by a cutting blade or the like, the end portions of the first internal electrode layers 31 and the second internal electrode layers 32 in the width direction W are curved. At this time, by adjusting the insertion angle and the insertion speed of the cutting blade, the end portions of about 90% or more of the first internal electrode layers 31 and the second internal electrode layers 32 can be curved in the pressing and cutting direction.

In addition, Sn may be provided at the interface between the first internal electrode layer 31 and the dielectric layer 20 and at the interface between the second internal electrode layer 32 and the dielectric layer 20. Sn may be layered or interspersed. Sn may form a solid solution in the first internal electrode layer 31 and the second internal electrode layer 32, or may form a solid solution in the dielectric grains of the dielectric layer 20. When Sn segregates and forms a solid solution at the interface between the internal electrode layer 30 and the dielectric layer 20, the insulating property is improved at this interface, and an increase in electric field intensity can be reduced or prevented. Therefore, the life of the multilayer ceramic capacitor 1, i.e., the decrease in reliability, can be reduced or prevented.

Next, the first side margin portion W11 and the second side margin portion W12 will be further described. When the dielectric of the first side margin portion W11 has a multi-layer configuration, in the first side margin portion W11, the thickness of the dielectric serving as the outermost layer adjacent to the first lateral surface WS1 may be larger than the thickness of the dielectric serving as the innermost layer adjacent to the internal electrode layer 30. For example, the thickness of the dielectric may gradually increase from the innermost layer toward the outermost layer. When the dielectric of the second side margin portion W12 has a multi-layer configuration, in the second side margin portion W12, the thickness of the dielectric serving as the outermost layer adjacent to the second lateral surface WS2 may be larger than the thickness of the dielectric serving as the innermost layer adjacent to the internal electrode layer 30. For example, the thickness of the dielectric may gradually increase from the innermost layer toward the outermost layer. With such a configuration, it is possible to obtain an advantageous effect of improving moisture resistance.

In a case where the dielectric of the first side margin portion W11 has a multi-layer configuration, in the first side margin portion W11, the average particle size of the dielectric grains included in the outermost layer (Ro) adjacent to the first lateral surface WS1 among the plurality of dielectric layers may be larger than the average particle size of the dielectric grains included in the innermost layer (Ri) adjacent to the internal electrode layer 30 among the plurality of dielectric layers. For example, the average particle size of the dielectric grains may gradually increase from the innermost layer (Ri) toward the outermost layer (Ro). Further, when the dielectric of the second side margin portion W12 has a multi-layer configuration, in the second side margin portion W12, the average particle size of the dielectric grains included in the outermost layer (Ro) adjacent to the second lateral surface WS2 among the plurality of dielectric layers may be larger than the average particle size of the dielectric grains included in the innermost layer (Ri) adjacent to the internal electrode layer 30 among the plurality of dielectric layers. For example, the average particle size of the dielectric grains may gradually increase from the innermost layer (Ri) toward the outermost layer (Ro). With such a configuration, it is possible to obtain an advantageous effect of improving moisture resistance.

Alternatively, in the first side margin portion W11, the average particle size of the dielectric grains included in the innermost layer (Ri) adjacent to the internal electrode layer 30 among the plurality of dielectric layers may conversely be larger than the average particle size of the dielectric grains included in the outermost layer (Ro) adjacent to the first lateral surface WS1 among the plurality of dielectric layers. For example, the average particle size of the dielectric grains may gradually increase from the outermost layer (Ro) toward the innermost layer (Ri). Further, in the second side margin portion W12, the average particle size of the dielectric grains included in the innermost layer (Ri) adjacent to the internal electrode layer 30 among the plurality of dielectric layers may be larger than the average particle size of the dielectric grains included in the outermost layer (Ro) adjacent to the second lateral surface WS2 among the plurality of dielectric layers. For example, the average particle size of the dielectric grains may gradually increase from the outermost layer (Ro) toward the innermost layer (Ri). With such a configuration, it is possible to obtain an advantageous effect of improving moisture resistance similarly to the abovementioned advantageous effect.

When the dielectric of the first side margin portion W11 has a single-layer configuration, in the first side margin portion W11, the average particle size of the dielectric grains included in a region (Ro) of the dielectric adjacent to the first lateral surface WS1 may be larger than the average particle size of the dielectric grains included in a region (Ri) of the dielectric adjacent to the internal electrode layer 30. For example, the average particle size of the dielectric grains may gradually increase from the internal electrode layer 30 toward the first lateral surface WS1. When the dielectric of the second side margin portion W12 has a single-layer configuration, the average particle size of the dielectric grains included in the second side margin portion W12 in a region (Ro) of the dielectric adjacent to the second lateral surface WS2 may be larger than the average particle size of the dielectric grains included in a region (Ri) of the dielectric adjacent to the internal electrode layer 30. For example, the average particle size of the dielectric grains may gradually increase from the internal electrode layer 30 toward the first lateral surface WS1. With such a configuration, it is possible to obtain an advantageous effect similarly to the abovementioned advantageous effect.

Alternatively, the average particle size of the dielectric grains included in the first side margin portion W11 in a region (Ri) of the dielectric adjacent to the internal electrode layer 30 may conversely be larger than the average particle size of the dielectric grains included in a region (Ro) of the dielectric adjacent to the first lateral surface WS1. For example, the average particle size of the dielectric grains may gradually increase from the first lateral surface WS1 toward the internal electrode layer 30. Further, the average particle size of the dielectric grains included in the second side margin portion W12 in a region (Ri) of the dielectric adjacent to the internal electrode layer 30 may be larger than the average particle size of the dielectric grains included in a region (Ro) of the dielectric adjacent to the second lateral surface WS2. For example, the average particle size of the dielectric grains may gradually increase from the first lateral surface WS1 side toward the internal electrode layer 30. With such a configuration, it is possible to obtain an advantageous effect of improving moisture resistance similarly to the abovementioned advantageous effect.

The average particle size of the dielectric grains included in the dielectric of the side margin portions W11 and W12 is calculated, for example, by the following procedure. First, the multilayer ceramic capacitor 1 is polished to the middle portion in the length direction L. Then, the cross sections of the side margin portions W11 and W12 in the vicinity of the middle stage in the lamination direction T are imaged at three points at a magnification of 10,000 times. Fifteen or more crystal grains are selected therefrom from the obtained images. Then, the grain sizes of the selected crystal grains are measured by image analysis to calculate the average value, thereby obtaining the average crystal grain size.

As a method for differentiating the average particle sizes of the dielectric grains included in the dielectrics of the side margin portions W11 and W12, for example, Mg or Mn may be added as a subcomponent to the ceramic material of the side margin portions W11 and W12 to adjust the addition amount of Mg or Mn. By adjusting the addition amount of Mg or Mn, the average particle size of the dielectric grains can be made different. The adjustment may be performed by adding Si.

When the dielectric of the first side margin portion W11 has a multi-layer configuration, the voids or gaps included in the first side margin portion W11 in the outermost layer (Ro) adjacent to the first lateral surface WS1 among the plurality of dielectric layers may be larger in number than the voids included in the innermost layer (Ri) adjacent to the internal electrode layer 30 among the plurality of dielectric layers. For example, the number of voids may gradually increase from the innermost layer (Ri) toward the outermost layer (Ro). When the dielectric of the second side margin portion W12 has a multi-layer configuration, in the second side margin portion W12, the voids included in the outermost layer (Ro) adjacent to the second lateral surface WS2 among the plurality of dielectric layers may be larger in number than the voids included in the innermost layer (Ri) adjacent to the internal electrode layer 30 among the plurality of dielectric layers. For example, the number of voids may gradually increase from the innermost layer (Ri) toward the outermost layer (Ro). With such a configuration, it is possible to obtain an advantageous effect of improving moisture resistance.

Alternatively, in the first side margin portion W11, the voids included in the innermost layer (Ri) adjacent to the internal electrode layer 30 among the plurality of dielectric layers may conversely be larger in number than the voids included in the outermost layer (Ro) adjacent to the first lateral surface WS1 among the plurality of dielectric layers. For example, the number of voids may gradually increase from the outermost layer (Ro) toward the innermost layer (Ri). Further, in the second side margin portion W12, the voids included in the innermost layer (Ri) adjacent to the internal electrode layer 30 among the plurality of dielectric layers may be larger in number than the voids included in the outermost layer (Ro) adjacent to the second lateral surface WS2 among the plurality of dielectric layers. For example, the number of voids may gradually increase from the outermost layer (Ro) toward the innermost layer (Ri). With such a configuration, it is possible to obtain an advantageous effect of improving moisture resistance similarly to the abovementioned advantageous effect.

When the dielectric of the first side margin portion W11 has a single-layer configuration, the voids included in the first side margin portion W11 in a region (Ro) of the dielectric adjacent to the first lateral surface WS1 may be larger in number than the voids included in a region (Ri) of the dielectric adjacent to the internal electrode layer 30. For example, the number of voids may gradually increase from the internal electrode layer 30 toward the first lateral surface WS1. Further, when the dielectric of the second side margin portion W12 has a single-layer configuration, the voids included in the second side margin portion W12 in a region (Ro) of the dielectric adjacent to the second lateral surface WS2 may be larger in number than the voids included in a region (Ri) of the dielectric adjacent to the internal electrode layer 30. For example, the number of voids may gradually increase from the internal electrode layer 30 toward the first lateral surface WS1. With such a configuration, it is possible to obtain an advantageous effect of improving moisture resistance similarly to the abovementioned advantageous effect.

Alternatively, the voids included in the first side margin portion W11 in a region (Ri) of the dielectric adjacent to the internal electrode layer 30 may conversely be larger in number than the voids included in a region (Ro) of the dielectric adjacent to the first lateral surface WS1. For example, the number of voids may gradually increase from the first lateral surface WS1 toward the internal electrode layer 30. Further, the voids included in the second side margin portion W12 in a region (Ri) of the dielectric adjacent to the internal electrode layer 30 may be larger in number than the voids included in the region (Ro) of the dielectric adjacent to the second lateral surface WS2. For example, the number of voids may gradually increase from the first lateral surface WS1 toward the internal electrode layer 30. With such a configuration, it is possible to obtain an advantageous effect of improving moisture resistance similarly to the abovementioned advantageous effect.

The porosity (pore ratio) included in the dielectric of the side margin portions W11 and W12 is calculated, for example, by the following procedure. First, a predetermined region of the cross section of each of the side margin portions W11 and W12 is imaged by SEM (Scanning Electron Microscope) at a magnification such that the viewing angle fits into a about 30 μm×about 30 μm slide. Next, a plurality of voids (pores) shown in the image obtained by imaging the predetermined region of the cross section of each of the side margin portions W11 and W12 are selected, the cross-sectional area of the porosity (pore ratio) is measured, and the average value thereof is calculated. Then, the ratio of the average value to the cross-sectional area of the predetermined region of the cross section of each of the imaged side margin portions W11 and W12 is calculated.

As described above, when the average particle size of the dielectric grains is made different by adjusting the addition amount of Mg or Mn or adjusting the amount of binder to be added, the number of voids included in the dielectric of the side margin portions W11 and W12 is different.

Manufacturing Method

Next, a method of manufacturing the above-described multilayer ceramic capacitor 1 will be described. First, a dielectric sheet used in manufacturing the dielectric layer 20 and an electrically conductive paste used in manufacturing the internal electrode layer 30 are prepared. The dielectric sheet and the electrically conductive paste include a binder and a solvent. As the binder and the solvent, well-known materials can be used.

Next, an internal electrode pattern is formed on the dielectric sheet by printing an electrically conductive paste on the dielectric sheet in a predetermined pattern, for example. As a method of forming the internal electrode pattern, screen printing, gravure printing, or the like can be used.

Next, a predetermined number of dielectric sheets used in manufacturing the second outer layer portion 102 on which no internal electrode pattern is printed are laminated. A dielectric sheet used in manufacturing the inner layer portion 100 on which the internal electrode pattern is printed is sequentially laminated thereon. A predetermined number of dielectric sheets used in manufacturing the first outer layer portion 101 on which no internal electrode pattern is printed are laminated thereon. A multilayer sheet is thereby produced.

Next, the multilayer sheet is pressed in the lamination direction by a device such as, for example, hydrostatic pressing to prepare a multilayer block. Next, the multilayer block is cut into a predetermined size such that the multilayer chip is cut out. At this time, the variation of the dimensions Dw in the width direction W of the internal electrode layers is within about 5% of the standard deviation. Further, both end portions of the internal electrode layers in the width direction W are aligned so as to be positioned in a range of about 3 μm in the width direction.

At this time, for example, when the internal electrode layers are pressed and cut by a cutting blade or the like, among the internal electrode layers, the end portions in the width direction W of 90% or more of the internal electrode layers in the middle in the lamination direction T are curved toward the second main surface TS2.

Next, the dielectric sheets used in manufacturing the first side margin portion W11 and the second side margin portion W12 are attached to the lateral surfaces of the multilayer chip. At this time, the corner portions and ridge portions of the multilayer chip are rounded by barrel polishing or the like.

Next, the multilayer chip is fired to prepare a multilayer body 10. The firing temperature is preferably, for example, about 900° C. or higher and about 1400° ° C. or lower, although it depends on the material of the dielectric and the internal electrode.

Next, by immersing the first end surface LS1 of the multilayer body 10 in an electrically conductive paste, which is an electrode material used in manufacturing the base electrode layer, the electrically conductive paste used in manufacturing the first base electrode layer 415 is applied to the first end surface LS1. Similarly, by immersing the second end surface LS2 of the multilayer body 10 in an electrically conductive paste, which is an electrode material for the base electrode layer, the electrically conductive paste used in manufacturing the second base electrode layer 425 is applied to the second end surface LS2. Thereafter, these electrically conductive pastes are fired, such that the first base electrode layer 415 and the second base electrode layer 425, which are fired layers, are formed. The firing temperature is preferably, for example, about 600° C. or higher and about 1000° ° C. or lower.

At this time, when, for example, Mg or Mn is added to the ceramic material of the side margin portions W11 and W12, grain growth of ceramic grains is reduced or prevented by the action of Mg or Mn. By adjusting the addition amount of Mg or Mn, in the side margin portions W11 and W12, the average particle size of the dielectric grains of the dielectric increases from the internal electrode layer toward the lateral surface WS1 or from the lateral surface toward the internal electrode layer. Further, in the side margin portions W11 and W12, the number of voids in the dielectric increases from the internal electrode layer toward the lateral surface WS1 or from the lateral surface toward the internal electrode layer. At this time, when Sn is added to the dielectric sheet used in manufacturing the dielectric layer 20 or the conductive paste used in manufacturing the internal electrode layer 30, Sn is provided on the interface between the internal electrode layer 30 and the dielectric layer 20 or on the dielectric layer 20 in the internal electrode.

In addition, as described above, the first base electrode layer 415 and the second base electrode layer 425, which are resin n layers, may be formed by applying an electrically conductive paste including electrically conductive particles and a thermosetting resin by a coating method and thermal-curing, or the first base electrode layer 415 and the second base electrode layer 425, which are thin films, may be formed by a thin film formation method such as, for example, a sputtering method or a vapor deposition method.

Furthermore, in the above description, the multilayer chip is fired, following which the base electrode layer is formed and fired. In other words, the multilayer body and the external electrodes are fired separately. However, the base electrode layer may be formed and fired before firing the multilayer chip. In other words, the multilayer body and the external electrodes may be fired simultaneously.

Thereafter, the first plated layer 416 is formed on the surface of the first base electrode layer 415 to form the first external electrode 41, and the second plated layer 426 is formed on the surface of the second base electrode layer 425 to form the second external electrode 42. Through the above steps, the above-described multilayer ceramic capacitor 1 is obtained.

As described above, according to the multilayer ceramic capacitor 1 of the present example embodiment, the end portions in the width direction W of about 90% or more of the internal electrode layers 30 among the plurality of internal electrode layers 30 are curved toward the second main surface TS2, that is, curved in one direction/the same direction. With such a configuration, it is possible to reduce or prevent short circuiting of the internal electrode layer 30.

Although example embodiments of the present invention have been described above, the present invention is not limited to the example embodiments described above, and various changes and modifications thereto are possible.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor comprising:

a multilayer body including a plurality of dielectric layers and a plurality of internal electrode layers laminated therein, a first main surface and a second main surface opposed to each other in a lamination direction, a first lateral surface and a second lateral surface opposed to each other in a width direction intersecting the lamination direction, and two end surfaces opposed to each other in a length direction intersecting the lamination direction and the width direction; and two external electrodes respectively provided on the two end surfaces of the multilayer body; wherein as seen in a plane including the width direction and the lamination direction in a middle portion in the length direction, among the plurality of internal electrode layers, end portions in the width direction of about 90% or more of internal electrode layers in a middle in the lamination direction are curved toward the second main surface;

an end portion in the width direction of at least one of the plurality of internal electrode layers is not curved toward the second main surface; and the end portions in the width direction of all of the plurality of internal electrode layers are each aligned to be positioned in a range of about 3 μm in the lamination direction.

2. The multilayer ceramic capacitor according to claim 1, wherein a variation in dimensions in the width direction of the plurality of internal electrode layers is within about ±5% in standard deviation.

3. The multilayer ceramic capacitor according to claim 1, wherein, among the plurality of internal electrode layers, about 90% or more of the internal electrode layers in the middle in the lamination direction each including the end portions in the width direction curved toward the second main surface include an internal electrode layer defining an outermost layer adjacent to the second main surface.

4. The multilayer ceramic capacitor according to claim 1, wherein the multilayer body includes a first side margin portion provided between the first lateral surface and ends of the plurality of internal electrode layers adjacent to the first lateral surface, and a second side margin portion provided between the second lateral surface and ends of the plurality of internal electrode layers adjacent to the second lateral surface; and each of the first side margin portion and the second side margin portion includes a plurality of dielectric layers provided in the width direction.

5. The multilayer ceramic capacitor according to claim 4, wherein in the first side margin portion, an average particle size of dielectric grains included in an outermost layer of the plurality of dielectric layers adjacent to the first lateral surface is larger than an average particle size of dielectric grains included in an innermost layer of the plurality of dielectric layers adjacent to the plurality of internal electrode layers; and in the second side margin portion, an average particle size of dielectric grains included in an outermost layer of the plurality of dielectric layer adjacent to the second lateral surface is larger than an average particle size of dielectric grains included in an innermost layer of the plurality of dielectric layers adjacent to the plurality of internal electrode layers.

6. The multilayer ceramic capacitor according to claim 4, wherein in the first side margin portion, an average particle size of dielectric grains included in an innermost layer of the plurality of dielectric layers adjacent to the plurality of internal electrode layers is larger than an average particle size of dielectric grains included in an outermost layer of the plurality of dielectric layers adjacent to the first lateral surface; and in the second side margin portion, an average particle size of dielectric grains included in an innermost layer of the plurality of dielectric layers adjacent to the plurality of internal electrode layers is larger than an average particle size of dielectric grains included in an outermost layer of the plurality of dielectric layers adjacent to the second lateral surface.

7. The multilayer ceramic capacitor according to claim 4, wherein in the first side margin portion, voids included in an outermost layer of the plurality of dielectric layers adjacent to the first lateral surface are larger in number than voids included in an innermost layer of the plurality of dielectric layers adjacent to the plurality of internal electrode layers; and in the second side margin portion, voids included in an outermost layer of the plurality of dielectric layers adjacent to the second lateral surface are larger in number than voids included in an innermost layer of the plurality of dielectric layers adjacent to the plurality of internal electrode layers.

8. The multilayer ceramic capacitor according to claim 4, wherein in the first side margin portion, voids included in an innermost layer of the plurality of dielectric layers adjacent to the plurality of internal electrode layers are larger in number than void included in an outermost layer of the plurality of dielectric layers adjacent to the first lateral surface; and in the second side margin portion, voids included in an innermost layer of the plurality of dielectric layers adjacent to the plurality of internal electrode layers are larger in number than voids included in an outermost layer of the plurality of dielectric layers adjacent to the second lateral surface.

9. The multilayer ceramic capacitor according to claim 1, wherein the multilayer body includes a first side margin portion provided between the first lateral surface and ends of the plurality of internal electrode layers adjacent to the first lateral surface, and a second side margin portion provided between the second lateral surface and ends of the plurality of internal electrode layers adjacent to the second lateral surface; and each of the first side margin portion and the second side margin portion includes one dielectric layer provided in the width direction.

10. The multilayer ceramic capacitor according to claim 9, wherein in the first side margin portion, an average particle size of dielectric grains included in a region of the dielectric layer adjacent to the first lateral surface is larger than an average particle size of dielectric grains included in a region of the dielectric layer adjacent to the plurality of internal electrode layers; and in the second side margin portion, an average particle size of dielectric grains included in a region of the dielectric layer adjacent to the second lateral surface is larger than an average particle size of dielectric grains included in a region of the dielectric layer adjacent to the plurality of internal electrode layers.

11. The multilayer ceramic capacitor according to claim 9, wherein in the first side margin portion, an average particle size of dielectric grains included in a region of the dielectric layer adjacent to the plurality of internal electrode layers is larger than an average particle size of dielectric grains included in a region of the dielectric layer adjacent to the first lateral surface; and in the second side margin portion, an average particle size of dielectric grains included in a region of the dielectric layer adjacent to the plurality of internal electrode layers is larger than an average particle size of dielectric grains include in a region of the dielectric layer adjacent to the second lateral surface.

12. The multilayer ceramic capacitor according to claim 9, wherein in the first side margin portion, voids included in a region of the dielectric layer adjacent to the first lateral surface are larger in number than voids included in a region of the dielectric layer adjacent to the plurality of internal electrode layers; and in the second side margin portion, voids included in a region of the dielectric layer adjacent to the second lateral surface are larger in number than voids included in a region of the dielectric layer adjacent to the plurality of internal electrode layers.

13. The multilayer ceramic capacitor according to claim 9, wherein in the first side margin portion, voids included in a region of the dielectric layer adjacent to the plurality of internal electrode layers are larger in number than voids included in a region of the dielectric layer adjacent to the first lateral surface; and in the second side margin portion, voids included in a region of the dielectric layer adjacent to the plurality of internal electrode layers are larger in number than voids included in a region of the dielectric layer adjacent to the second lateral surface.

14. The multilayer ceramic capacitor according to claim 1, wherein each of the plurality of dielectric layers has a thickness of about 0.3 μm or more and about 0.5 μm or less.

15. The multilayer ceramic capacitor according to claim 1, wherein the plurality of internal electrode layers include a plurality of first internal electrode layers and a plurality of second internal electrode layers which oppose one another; and at least some of both of the plurality of first internal electrode layers and the plurality of second internal electrode layers include the end portions which are curved toward the second main surface.

16. The multilayer ceramic capacitor according to claim 15, wherein the multilayer body includes a first side margin portion provided between the first lateral surface and ends of the plurality of internal electrode layers adjacent to the first lateral surface, and a second side margin portion provided between the second lateral surface and ends of the plurality of internal electrode layers adjacent to the second lateral surface; and each of the first side margin portion and the second side margin portion includes a plurality of dielectric layers provided in the width direction.

17. The multilayer ceramic capacitor according to claim 16, wherein the end portions which are curved toward the second main surface are adjacent to one of the first side margin portion and the second side margin portion.

18. The multilayer ceramic capacitor according to claim 16, wherein central portions of the plurality of internal electrode layers are located in an electrode counter portion of the multilayer body; and the first side margin portion and the second side margin portion sandwich the electrode counter portion.

19. The multilayer ceramic capacitor according to claim 18, wherein the end portions are located in both the first and second side margin portions and also the electrode counter portion.

* * * * *